(12) United States Patent
Kulkarni et al.

(10) Patent No.: US 12,182,444 B2
(45) Date of Patent: Dec. 31, 2024

(54) EFFICIENT SCHEDULING OF DATA STORAGE DISC INPUT/OUTPUT

(71) Applicant: Seagate Technology LLC, Fremont, CA (US)

(72) Inventors: Ajay Narayan Kulkarni, Longmont, CO (US); Ronny Fnu, Longmont, CO (US); Harry Tiotantra, Shugart (SG); Mark A. Gaertner, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/703,303

(22) Filed: Mar. 24, 2022

(65) Prior Publication Data

US 2023/0305746 A1 Sep. 28, 2023

(51) Int. Cl.
*G06F 3/06* (2006.01)
(52) U.S. Cl.
CPC .......... *G06F 3/0659* (2013.01); *G06F 3/0604* (2013.01); *G06F 3/0611* (2013.01); *G06F 3/0674* (2013.01)
(58) Field of Classification Search
None
See application file for complete search history.

(56) References Cited

U.S. PATENT DOCUMENTS

| 5,390,313 | A | | 2/1995 | Yanai et al. |
| 5,570,332 | A | * | 10/1996 | Heath .................... G11B 19/20 360/78.04 |
| 5,828,902 | A | * | 10/1998 | Tanaka ................. G11B 27/105 710/39 |
| 6,272,565 | B1 | | 8/2001 | Lamberts |
| 6,442,648 | B1 | | 8/2002 | Genduso et al. |
| 6,571,298 | B1 | | 5/2003 | Megiddo |
| 6,725,327 | B1 | | 4/2004 | Espeseth et al. |
| 6,763,404 | B2 | | 7/2004 | Berning et al. |
| 7,010,653 | B2 | | 3/2006 | Uchida et al. |
| 7,043,567 | B2 | | 5/2006 | Trantham |
| 7,644,206 | B2 | | 1/2010 | Lawson et al. |
| 8,498,074 | B1 | | 7/2013 | Mobley et al. |
| 9,747,043 | B2 | | 8/2017 | Zayas et al. |
| 2010/0011168 | A1 | | 1/2010 | Ryu et al. |
| 2017/0344425 | A1 | * | 11/2017 | Akiyama ............ G06F 11/1048 |

OTHER PUBLICATIONS

Johnston, L & Charikar, M & Valiant, G. Lecture 8 HashTables, Universal Hash Functions, Balls and Bins [PDF slides]. (Feb. 6, 2017). Computer Science Department, Stanford University. http://web.stanford.edu/class/archive/cs/cs161/cs161.1176/Lectures/CS161Lecture08.pdf (Year: 2017).*
Vasily Tarasov et al., "Efficient I/O Scheduling with Accurately Estimated Disk Drive Latencies", Published 2012, 10 pages.

* cited by examiner

*Primary Examiner* — Stephanie Wu
(74) *Attorney, Agent, or Firm* — Westman, Champlin & Koehler, P.A.

(57) ABSTRACT

A method includes creating a table with a plurality of cells indicative of intersections of tracks and wedges on a data storage disc surface. The method also includes storing disc pending command information for different disc pending commands in corresponding different cells of the plurality of cells according to locations for the different disc pending commands on the data storage disc surface. The method further includes searching the table for one or more next disc pending commands of the different disc pending commands to schedule for execution.

17 Claims, 4 Drawing Sheets

Disc Pending Commands

FIG. 1D

|  | 0 | 1 | 2 | 3 | ... | 10 | ... | M |
|---|---|---|---|---|---|---|---|---|
| 0 | | | | | | | | |
| ... | | | | | | | | |
| 24 | | | | | | | | |
| ... | | | | | | | | |
| 49 | A' | B' | | | | | | |
| ... | | | | | | | | |
| 74 | | | | C' | | | | |
| ... | | | | | | | | |
| 99 | | | | | | | | |
| ... | | | | | | | | |
| 124 | | | | | | D' | | |
| ... | | | | | | | | |
| 149 | | | | | | E' | | |
| ... | | | | | | | | |
| N | | | | | | | | |

Wedge Information

Track/Cylinder Information

180

200

202
Create a hash table with a plurality of hash table cells formed at intersections of track bins and wedge bins associated with tracks and wedges, respectively, on a data storage disc surface

204
Hash an extent of each of the different disc pending commands to the interesting wedge bin and track bin coresponding to a location for the disc pending command on the data storage disc surface to obtain a plurality of hashed extents

206
Store different hashed extents of the plurality of hashed extents of the different disc pending commands into different hash table cells

FIG. 2

EFFICIENT SCHEDULING OF DATA STORAGE DISC INPUT/OUTPUT

SUMMARY

In one embodiment, a method is provided. The method includes creating a table with a plurality of cells indicative of intersections of tracks and wedges on a data storage disc surface. The method also includes storing disc pending command information for different disc pending commands in corresponding different cells of the plurality of cells according to locations for the different disc pending commands on the data storage disc surface. The method further includes searching the table for one or more next disc pending commands of the different disc pending commands to schedule for execution.

In another embodiment, a data storage system is provided. The data storage system includes at least one data storage disc comprising at least one data storage surface, and at least one head configured to interact with the at least one data storage surface. The data storage system also includes a memory comprising a table with a plurality of cells indicative of intersections of tracks and wedges on the at least one data storage surface. The data storage system further includes a controller that is communicatively coupled to the at least one head and the memory. The controller is configured to store disc pending command information for different disc pending commands in corresponding different cells of the plurality of cells according to locations for the different disc pending commands on the at least one data storage surface. The controller is also configured to search the table for one or more next disc pending commands of the different disc pending commands to schedule for execution by the at least one head.

In yet another embodiment, a data storage device is provided. The data storage device includes a data storage disc stack comprising a plurality of data storage discs with each data storage disc comprising at least one data storage surface. The data storage device also includes a memory comprising a table with a plurality of cells indicative of intersections of cylinders and wedges on the data storage surfaces of the plurality of data storage surfaces. The memory further includes a controller that is communicatively coupled to the memory. The controller is configured to store disc pending command information for different disc pending commands in corresponding different cells of the plurality of cells according to locations for the different disc pending commands on the data storage surface.

This summary is not intended to describe each disclosed embodiment or every implementation of efficient scheduling of data storage disc input/output as described herein. Many other novel advantages, features, and relationships will become apparent as this description proceeds. The figures and the description that follow more particularly exemplify illustrative embodiments.

BRIEF DESCRIPTION OF THE DRAWINGS

FIG. 1D shows a disc pending command table in accordance with one embodiment.

FIG. 2 is a simplified flow diagram of a method embodiment.

DETAILED DESCRIPTION OF ILLUSTRATIVE EMBODIMENTS

Embodiments of the disclosure relate to efficiently scheduling disc pending commands or disc input/output (I/O) in a data storage device such as a hard disc drive (HDD).

In data storage devices such as HDDs and hybrid drives, data storage media include discs with data storage surfaces having tracks between an inner diameter (ID) and an outer diameter (OD) of the disc on which data is stored and retrieved with the help of a read/write head. The data storage surfaces are also divided into pie-shaped wedges. Disc pending commands or disc I/O in such data storage devices include read, write, read verification and other operations that may be background, cached, reliability-related or host-outstanding operations.

To efficiently schedule disc pending commands, embodiments of the disclosure take into consideration a current head position, and both wedge and track locations between the ID and OD of disc pending commands for command scheduling. Prior to providing details regarding the different embodiments, a description of an illustrative operating environment is provided below.

Figure 1A:
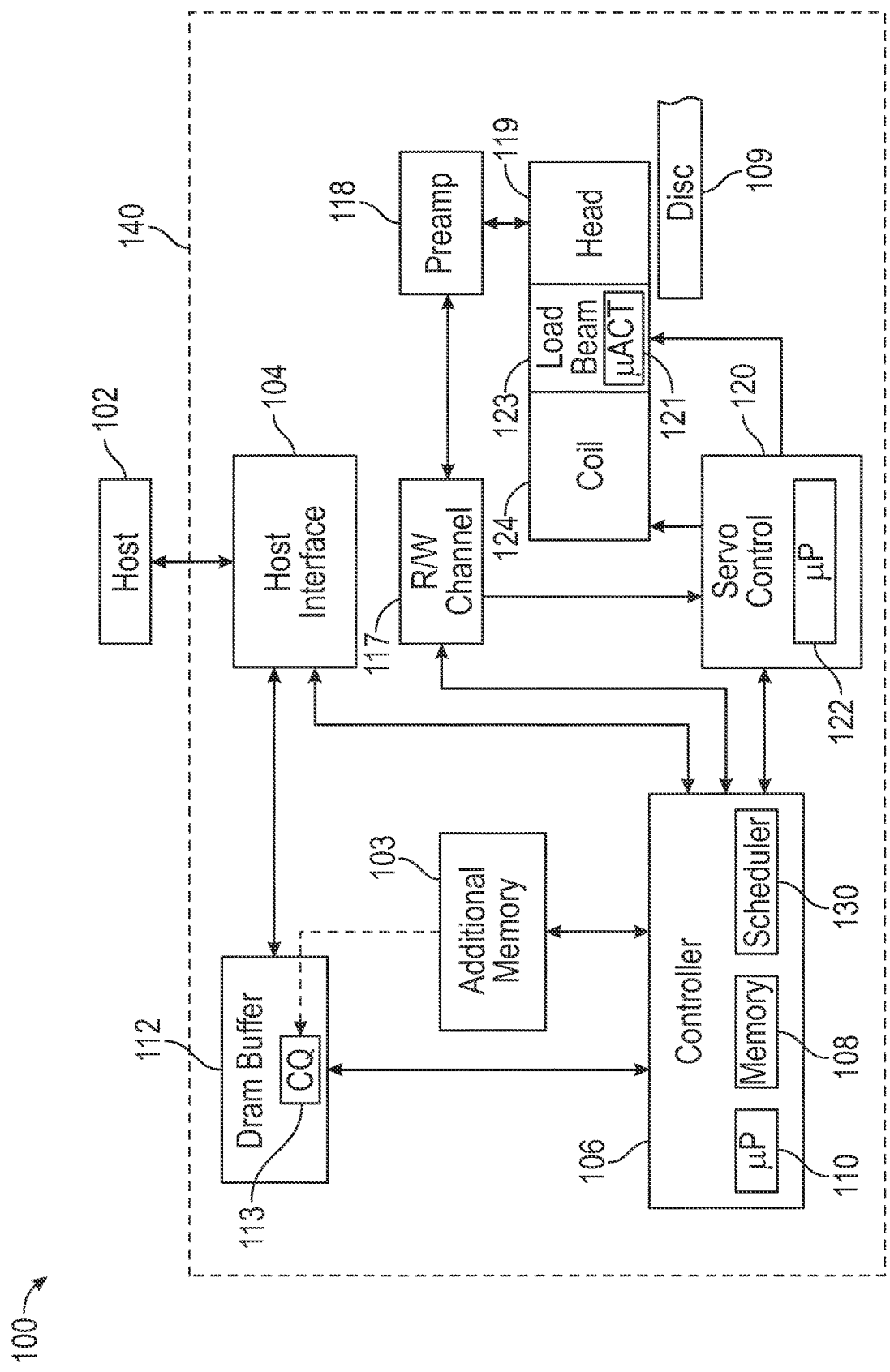
FIG. 1A is a diagrammatic illustration of a system in which scheduling of disc pending commands is carried out in accordance with certain embodiments of the present disclosure.

FIG. 1A shows an illustrative operating environment in which certain specific embodiments disclosed herein may be incorporated. The operating environment shown in FIG. 1A is for illustration purposes only. Embodiments of the present disclosure are not limited to any particular operating environment such as the operating environment shown in FIG. 1A. Embodiments of the present disclosure are illustratively practiced within any number of different types of operating environments.

It should be noted that the same or like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected,"

"directly coupled" or "directly attached" to another element, there are no intervening elements present. Drawings illustrating direct connections, couplings or attachments between elements also include embodiments, in which the elements are indirectly connected, coupled or attached to each other.

FIG. 1A is a diagrammatic illustration of a system in which scheduling of disc pending commands is carried out in accordance with certain embodiments of the present disclosure. Specifically, FIG. 1A provides a simplified block diagram of a data storage device (DSD) 100. The DSD 100 may be coupled to a host 102 and may service commands from the host 102. The host 102 may also be referred to as the host system, host device or host computer. The host 102 can be a desktop computer, a laptop computer, a server, a tablet computer, a telephone, a music player, another electronic device, or any combination thereof. The DSD 100 can communicate with the host device 102 via a hardware or firmware-based interface 104. The interface 104 may comprise any interface that allows communication between a host 102 and a DSD 100, either wired or wireless, such as USB, IEEE 1394, Compact Flash, SATA, eSATA, PATA, SCSI, SAS, PCIe, NVMe, Fibre Channel, Ethernet, or Thunderbolt, among others. The interface 104 may include a connector (not shown) that allows the DSD 100 to be physically removed from the host 102. In some embodiments, the DSD 100 may have a casing 140 housing the components of the DSD 100, or the components of the DSD 100 may be attached to the housing 140, or a combination thereof.

DSD 100 can include a buffer (e.g., a DRAM buffer) 112 and a programmable controller 106. Buffer 112 can temporarily store data during read and write operations, and can include a command queue (CQ) 113 where multiple pending operations can be temporarily stored pending execution. Commands arriving over the interface 104 may automatically be received in the CQ 113 or may be stored there by controller 106, interface 104, or another component.

Programmable controller 106 can include associated memory 108 and processor 110. In some embodiments, the DSD 100 can include a read-write (R/W) channel 117, which can encode data during write operations and reconstruct user data retrieved from a memory, such as disc(s) 109, during read operations. A preamplifier circuit (preamp) 118 can apply write currents to one or more heads 119 and provides pre-amplification of read-back signals. A servo control circuit 120 may use servo data to provide the appropriate current to a coil 124, sometimes called a voice coil motor (VCM), to position the head(s) 119 over a desired area of the disc(s) 109. The controller 106 can communicate with a processor 122 to move the head(s) 119 to the desired locations on the disc(s) 109 during execution of various pending commands in the CQ 113.

In some embodiments, the DSD 100 may include solid state memory in addition to disc memory. For example, the DSD 100 can include an additional memory 103, which can be either volatile memory such as DRAM or SRAM, or nonvolatile memory, such as NAND Flash memory. The additional memory 103 can function as a cache and store recently or frequently read or written data, or data likely to be read soon. In one embodiment, additional memory 103 may be used as a cache tier from where the CQ 113 may be populated. Additional memory 103 may also function as main storage in addition to disc(s) 109. A DSD 100 containing multiple types of nonvolatile storage media, such as a disc(s) 109 and Flash memory 103, may be referred to as a hybrid storage device or hybrid drive.

To read or write data to a storage medium such as disc(s) 109, DSD 100 may employ servo data to properly position head 119 over a desired track. Servo data used to identify a head's location over a disc may be recorded onto disc(s) 109, interspersed between user data. Servo data may be read from disc(s) 109 by head 119 as the disc(s) 109 spin and the head 119 position is adjusted. The read servo data may be provided to preamp circuit 118. The preamp circuit 118 may preamplify and filter the readback signals from the transducer head 119, and provide the processed servo data to read/write channel 117. The R/W channel 117 can detect and condition the servo data, including application of automatic gain control and conversion of the signals to digital form.

Servo control 120 can process the digitized servo data to generate a current command signal. The command signal may be used to apply the appropriate current to the coil 124 to position the transducer 119 over the disc(s) 109. The servo data may be used to determine a current track location of the head 119, and calculate adjustments to move to a target track, which may be called track seeking. Once the head 119 is over a desired track, the servo data may be used to maintain the head's position over the track during read or write operations, which may be called track following.

In certain embodiments, to attain fine position control of the head 119 relative to a selected data track, a head stack assembly (HSA) can include one or more micro-actuators (μACT) 121 (which may also be referred to as secondary or tertiary actuator motors) supported by a load beam 123. The micro-actuator 121 can include a bipolar piezoelectric transducer that responds to positive voltage inputs by expanding in a predetermined direction, while contracting in the predetermined direction to application of a negative voltage. As the micro-actuator 121 can be affixed to the load beam 123 of a HSA, changes in mechanical position of the micro-actuator relative to the selected data track results in changes in mechanical position of the head 119 relative to the selected data track of the disc 109, thereby facilitating fine position control of the head 119 relative to the selected data track. Structures (such as 121, 123 and 124) for supporting and moving the head 119 are collectively referred to herein as an actuator. Although a single actuator is shown in FIG. 1A, multiple actuators supporting different heads 119 that communicate with one or more data storage surfaces may be employed.

In DSD 100, write commands from host 102 may be satisfied by initially writing the data associated with the commands in a cache (e.g., in a portion of DRAM 112, in additional memory 103 and/or in a media cache on disc 109), and indicating to the host 102 that the commands are completed when the data is still in the write cache. Sometime later, the data from the write cache is transferred to main storage locations on disc 109. However, host 102 read commands may be pending until the data is retrieved from the main storage locations (e.g., locations on disc 109) and returned to the host 102. As indicated above, disc 109 pending commands or disc I/O may include read, write, read verification and other operations that may be background, cached, reliability-related or host-outstanding operations. A command scheduler (sometimes referred to herein as simply a scheduler) 130 may order the disc 109 pending commands to be carried out according to one or more criteria. The scheduler 130 may be a processor, controller, or other circuit, or it may be a set of software instructions that, when executed by a processing device, perform the command scheduling functions. In some embodiments, the scheduler 130 may be part of or executed by controller 106. In general, disc 109 pending command scheduling and control functions in accordance with embodiments of the disclosure may be performed by any suitable processor in DSD 100. Also, in general, to manage scheduling of disc 109 pending commands, scheduler 130 may consider several command-related criteria such as access time, power/energy, age/priority, cache saturation level, disc operation type, reliability needs, etc. Additionally, as will be described in detail below, scheduler 130 takes into consideration a current head position and locations for disc 109 pending commands in a manner described below in connection with FIGS. 1B-1D.

Figure 1B:
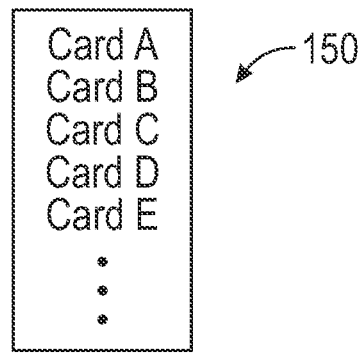
FIG. 1B shows an example of a disc pending command list.

FIG. 1B shows a disc pending command list 150 including a currently-executing command A and example pending commands B, C, D and E. It should be noted that the currently-executing command A and the four disc pending commands B, C, D and E shown in list 150 are merely examples, and any number of commands (e.g., thousands, hundreds of thousands or more commands) may be pending and included in list 150.

Figure 1C:
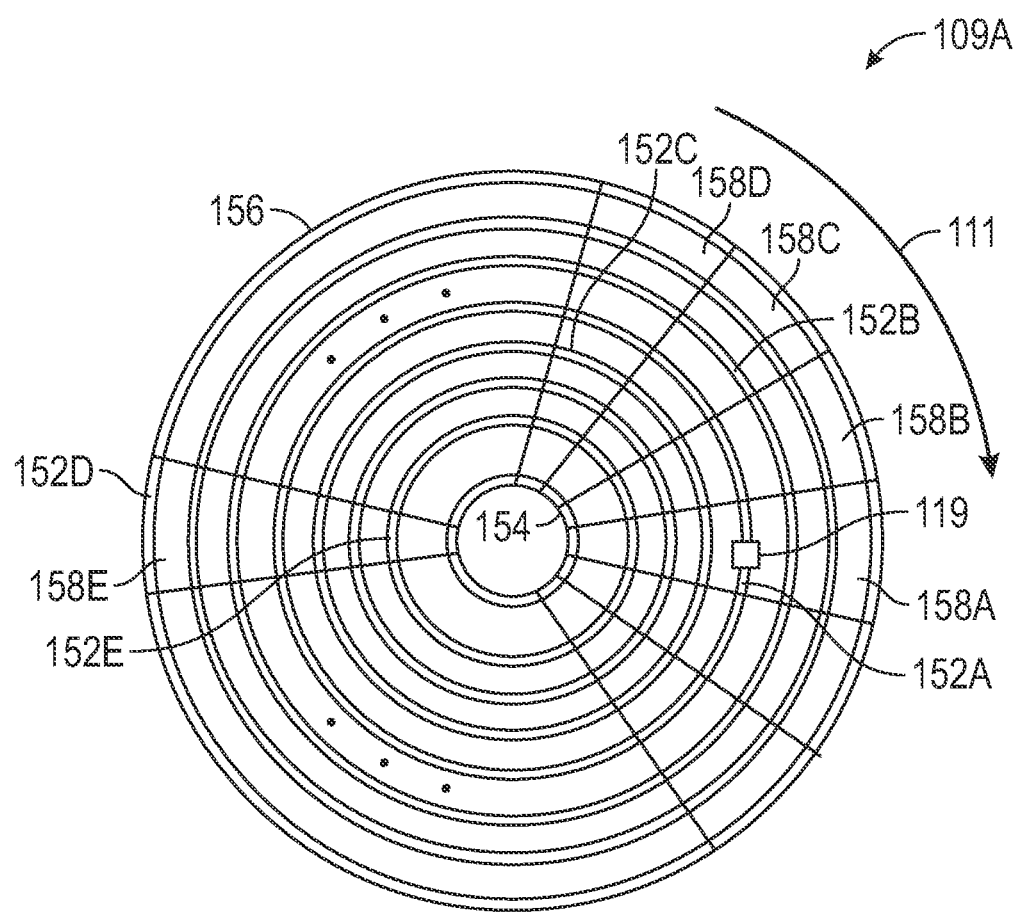
FIG. 1C is a top view of a data storage disc.

FIG. 1C illustrates a disc surface 109A that includes numerous tracks 152 between an ID 154 and an OD 156 of the disc surface 109A. Disc surface 109A also includes multiple wedges 158A, 158B, 158C, 158D, 158E, etc., with each wedge 158 extending between the ID 154 and the OD 156. In the example of FIG. 1C, a current location of head 119 is over a logical block address (LBA) of currently-executing command A (e.g., a last LBA location on disc surface 109A of command A). As can be seen in FIG. 1C, the current location of head 119 is over wedge 158A, and over track 152A. A first extent for disc pending command B is within wedge 158B and in track 152B, a first extent for disc pending command C is within wedge 158D and in track 152C, a first extent for disc pending command D is within wedge 158E and in track 152D, and a first extent for disc pending command E is within wedge 158E and in track 152E. As noted above, embodiments of the disclosure take into consideration a current head position, and both wedge and track locations between the ID 154 and OD 156 of disc pending commands for command scheduling. Some embodiments of the disclosure employ a table that includes cells indicative of intersections of tracks and wedges on a data storage disc surface. One such embodiment is described below in connection with FIG. 1D.

FIG. 1D shows a disc pending command table 180 in accordance with one embodiment. Disc pending command table 180 includes information that corresponds to disc locations for disc commands A, B, C, D and E shown in FIG. 1C and discussed above. In FIG. 1D, columns are associated with wedges and rows are associated with tracks. In disc pending command table 180, location A' is an ending location of a current command at wedge 0 and track 74, which are denoted by 158A and 152A, respectively in FIG. 1C. In FIG. 1D, location B', C', D' and E' are data storage disc surface starting locations (e.g., wedge and track intersection locations of initial command LBA extents) for the four example disc pending commands B, C, D and E described above. Thus, in disc pending command table 180, B' is a starting location of disc pending command B at wedge 1 and track 49, which are denoted by 158B and 152B, respectively in FIG. 1C. Similarly, C' is a starting location of disc pending command C at wedge 3 and track 99, which are denoted by 158D and 152C, respectively in FIG. 1C. D' is a starting location of disc pending command D at wedge 10 and track 0, which are denoted by 158E and 152D, respectively in FIG. 1C, and E' is a starting location of disc pending command E at wedge 10 and track 149, which are denoted by 158E and 152E, respectively in FIG. 1C.

If, for example, command A is just completing or has just completed, a limited-area search that includes a portion of wedge 1 limited to tracks 49-99 in cells of disc pending command table 180 may first be carried out. This search may result in the selection of command B as a possible command for scheduling as the next command to execute after command A. However, since the disc is spinning as the scheduling calculations are being made, and since wedge 1 is next to wedge 0, location B' may either be unreachable using available seek speeds or may require a seek speed that consumes an undesirably high amount of power in the extremely short duration of time between the identification of B' for scheduling and the appearance of sector 1 under the head 119. Thus, command B may be not be selected, and a second limited-area search that includes, for example, a portion of wedge 2 limited to, for example, tracks 36-124 (not shown) in disc pending command table 180 may be carried out. Since no pending command extents are located in wedge 2, the second search does not return any results. Thus, a third search that includes, for example, a portion of wedge 3 limited to tracks 24-124 in disc pending command table 180 may be carried out. This yields command C, which may be scheduled for execution after command A. If command C is either unreachable or not suitable for some other reason, the search windows can continue to be enlarged for subsequent wedges. This may lead to a search that includes, for example, a portion of wedge 10 limited to tracks 0-149. This yields commands D and E, which are equidistant from current head position A'. Therefore, in deciding whether to schedule command D or command E for execution after command A, other criteria such as whether command D or command E provides a better opportunity to schedule another command, etc., may be taken into consideration when deciding to schedule either command D or command E for execution after command A.

In the example provided in connection with FIG. 1D, the search limits or widows can be successively enlarged because each subsequent wedge is farther away from A', thereby allowing more time to seek to a wider distribution of track portions within a wedge. Such a search with successively growing windows may be collectively viewed as a flashlight beam—the farther away from the flashlight (current head position), the broader the beam (possible pending command search area). Starting with a limited-area search instead of, for example, searching all track portions within a wedge is more efficient for scheduling disc pending commands.

In the example disc pending command table 180 of FIG. 1D, the extent to which the rows and/or columns are occupied may also be taken into consideration when carrying out the search for next disc pending commands to schedule. Thus, in some embodiments, links (e.g., linked lists or a bitmap table) may be provided for disc pending command table 180. In such embodiments, links may connect, for example, the rows and/or columns of table 180 that are occupied by one or more command extents and bypass the rows and/or columns that are not occupied by extents. Also, the starting extents (e.g., A', B', C', D' and E') for the commands (e.g., A', B', C', D' and E') may be linked in wedge/cylinder order. This enables any empty rows and/or columns to be skipped when the search is carried out. Such an approach is especially useful for speeding up the search for next commands to schedule when the disc pending command table 180 is sparsely populated. Starting extents for any command may be deleted from both the disc pending command table 180 and the links when the command is completed, and starting extents for new disc pending commands to be scheduled may be added to the disc pending command table 180 and inserted into the links.

Due to the large number of tracks on a typical data storage disc surface, disc pending command table such as 180 may be extremely large. Thus, in some embodiments, hashing may be employed to reduce the table size. When hashing is employed, a disc pending command table such as 180 will include wedge hash bins instead of wedges and cylinder/track hash bins instead of tracks/cylinders. In such embodiments, each wedge hash bin may include information for multiple wedges, and each cylinder/track hash bin may include information for multiple cylinders/tracks. In other respects, the hash table will be employed in a manner similar to table 180 described above in connection with FIG. 1D.

FIG. 2 is a simplified flow diagram of a method 200 that employs a hash table in accordance with one embodiment. The method includes creating a hash table with a plurality of hash table cells formed at intersections of track bins and wedge bins associated with tracks and wedges, respectively, on a data storage disc surface at 202. At 204, an extent (e.g., a first extent) of each of the different disc pending commands is hashed to the intersecting wedge bin and track bin corresponding to a location for the disc pending command on the data storage disc surface to obtain a plurality of hashed extents. At 206, different hashed extents of the plurality of hashed extents of the different disc pending commands are stored into different hash table cells of the plurality of hash table cells according to the different intersecting wedge and track bins corresponding to the different locations for the different disc pending commands on the data storage disc surface.

Some embodiments may include forming first links of any track bins that include one or more of the plurality of hashed first extents, forming second links of any wedge bins that include one or more of the plurality of hashed first extents, and forming third links of the stored different hashed first extents. In such embodiments, at least one of the first links, the second links or the third links may be employed to search the hash table for the one or more next disc pending commands of the different disc pending commands to schedule for execution.

In the above description, the successively growing windows employed to search for disc pending commands are described in connection successive table columns. However, the successively growing search windows may alternatively be used for searching successive table rows for disc pending commands.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   creating a table with a plurality of cells indicative of intersections of tracks and wedges on a data storage disc surface;
   storing disc pending command information for different disc pending commands in corresponding different cells of the plurality of cells according to locations for the different disc pending commands on the data storage disc surface;
   linking at least one of rows or columns that are occupied by command extents of the disc pending command information;
   searching the table for one or more next disc pending commands of the different disc pending commands to schedule for execution; and
   accelerating the search using the linked at least one of rows or columns,
   wherein accelerating the search comprises skipping at least one of the rows or the columns that are not occupied by any command extents.

2. The method of claim 1, and wherein searching the table for one or more next disc pending commands of the different disc pending commands to schedule for execution comprises:
   identifying a head location cell of the plurality of cells corresponding to a current location of a head over the data storage disc surface;
   generating a first search window that includes first cells of the plurality of cells that are within a first column of the table at a first predetermined distance from the head location cell;
   determining whether any of the disc pending command information is within the first search window; and when none of the disc pending command information is within the first search window or when any of the disc pending command information in the first search window is not applicable for one or more predetermined search conditions, generating a second search window that includes second cells of the plurality of cells that are within a second column of the table at a second predetermined distance from the head location cell, the second predetermined distance being greater than the first predetermined distance, and the second cells being greater in number than the first cells.

3. The method of claim 1, and wherein searching the table for one or more next disc pending commands of the different disc pending commands to schedule for execution comprises:
identifying a head location cell of the plurality of cells corresponding to a current location of a head over the data storage disc surface;
generating a first search window that includes first cells of the plurality of cells that are within a first row of the table at a first predetermined distance from the head location cell;
determining whether any of the disc pending command information is within the first search window; and
when none of the disc pending command information is within the first search window or when any of the disc pending command information in the first search window is not applicable for one or more predetermined search conditions, generating a second search window that includes second cells of the plurality of cells that are within a second row of the table at a second predetermined distance from the head location cell, the second predetermined distance being greater than the first predetermined distance, and the second cells being greater in number than the first cells.

4. The method of claim 1, wherein starting extents of the command extents are linked in wedge or cylinder order.

5. The method of claim 1, and further comprising deleting starting extents for any disc pending command from both the disc pending command table and existing links of the linked at least one of rows or columns when the disc pending command is completed.

6. The method of claim 5, and further comprising adding starting extents for new disc pending commands to be scheduled to the disc pending command table and inserting the starting extents for the new disc pending commands into existing links of the linked at least one of rows or columns.

7. A data storage system comprising:
at least one data storage disc comprising at least one data storage surface;
at least one head configured to interact with the at least one data storage surface;
a memory comprising a table with a plurality of cells indicative of intersections of tracks and wedges on the at least one data storage surface; and
a controller, communicatively coupled to the at least one head and the memory, the controller configured to:
store disc pending command information for different disc pending commands in corresponding different cells of the plurality of cells according to locations for the different disc pending commands on the at least one data storage surface;
link at least one of rows or columns that are occupied by command extents of the disc pending command information;
search the table for one or more next disc pending commands of the different disc pending commands to schedule for execution by the at least one head;
accelerate the search using the linked at least one of rows or columns; and
accelerate the search by skipping at least one of the rows or the columns that are not occupied by any command extents.

8. The data storage system of claim 7, and wherein the controller is further configured to search the table for the one or more next disc pending commands of the different disc pending commands to schedule for execution by the at least one head by:
identifying a head location cell of the plurality of cells corresponding to a current location of the at least one head over the at least one data storage surface;
generating a first search window that includes first cells of the plurality of cells that are within a first column of the table at a first predetermined distance from the head location cell;
determining whether any of the disc pending command information is within the first search window; and
when none of the disc pending command information is within the first search window or when any of the disc pending command information in the first search window is not applicable for one or more predetermined search conditions, generating a second search window that includes second cells of the plurality of cells that are within a second column of the table at a second predetermined distance from the head location cell, the second predetermined distance being greater than the first predetermined distance, and the second cells being greater in number than the first cells.

9. The data storage system of claim 7, and wherein the controller is further configured to search the table for the one or more next disc pending commands of the different disc pending commands to schedule for execution by the at least one head by:
identifying a head location cell of the plurality of cells corresponding to a current location of the at least one head over the at least one data storage surface;
generating a first search window that includes first cells of the plurality of cells that are within a first row of the table at a first predetermined distance from the head location cell;
determining whether any of the disc pending command information is within the first search window; and
when none of the disc pending command information is within the first search window or when any of the disc pending command information in the first search window is not applicable for one or more predetermined search conditions, generating a second search window that includes second cells of the plurality of cells that are within a second row of the table at a second predetermined distance from the head location cell, the second predetermined distance being greater than the first predetermined distance, and the second cells being greater in number than the first cells.

10. The data storage device of claim 7, wherein the controller is further configured to link starting extents of the command extents in wedge or cylinder order.

11. The data storage device of claim 7, wherein the controller is further configured to delete starting extents for any disc pending command from both the disc pending command table and existing links of the linked at least one of rows or columns when the command is completed.

12. The data storage device of claim 11, wherein the controller is further configured to add starting extents for new disc pending commands to be scheduled to the disc pending command table and further configured to insert the starting extents for the new disc pending commands into existing links of the linked at least one of rows or columns.

13. A data storage device comprising:
a data storage disc stack comprising a plurality of data storage discs with each data storage disc comprising at least one data storage surface;
at least one head configured to interact with at least one data storage surface of the data storage surfaces;
a memory comprising a table with a plurality of cells indicative of intersections of cylinders and wedges on the data storage surfaces of the plurality of data storage surfaces; and
a controller, communicatively coupled to the memory, the controller configured to;
store disc pending command information for different disc pending commands in corresponding different cells of the plurality of cells according to locations for the different disc pending commands on the at least one data storage surface;
store links for at least one of rows or columns that are occupied by command extents of the disc pending command information in the memory;
search the table for one or more next disc pending commands of the different disc pending commands to schedule for execution by the at least one head; and
accelerate the search using the stored links for the at least one of rows or columns and by skipping at least one of the rows or the columns that are not occupied by any command extents.

14. The data storage device of claim 13, and wherein the controller is further configured to search the table for one or more next disc pending commands of the different disc pending commands to schedule for execution by:
(a) identifying a head location cell of the plurality of cells corresponding to a current location of a head over the data storage disc surface;
(b) generating a search window that includes cells of the plurality of cells that are within a column of the table at a predetermined distance from the head location cell;
(c) determining whether any of the disc pending command information is within the search window; and
(d) when at least some of the disc pending command information is within the search window and the disc pending command information in the search window is applicable for one or more predetermined search conditions, selecting the one or more next disc pending commands to schedule for execution form the disc pending command information in the search window.

15. The data storage device of claim 14 and wherein:
when none of the disc pending command information is within the search window or when any of the disc pending command information in the search window is not applicable for the one or more predetermined search conditions, the controller is further configured to repeat (b) and (c) iteratively with each iteration generating and employing a larger new search window until the one or more next disc pending commands of the different disc pending commands to schedule for execution by the at least one head are found; and
the larger new search window for each consecutive iteration includes newly selected cells of the plurality of cells that are within a next column of the table at a next predetermined distance from the head location cell, the next predetermined distance being greater than a prior predetermined distance for an immediately previous iteration, and the newly selected cells being greater in number than the prior cells for the immediately previous iteration.

16. The data storage device of claim 13, wherein controller is further configured to link starting extents of the command extents in wedge or cylinder order.

17. The data storage device of claim 13, wherein the controller is further configured to delete starting extents for any command from both the disc pending command table and existing links of the linked at least one of rows or columns when the disc pending command is completed, and to add starting extents for new disc pending commands to be scheduled to the disc pending command table and insert the starting extents for the new disc pending commands into existing links of the linked at least one of rows or columns.

* * * * *